(12) United States Patent
Polewarczyk et al.

(10) Patent No.: US 7,566,094 B2
(45) Date of Patent: Jul. 28, 2009

(54) ENHANCED FUNCTIONALITY VEHICLE CLOSURE PANEL ASSEMBLY

(75) Inventors: Joseph M. Polewarczyk, Rochester Hills, MI (US); Kevin G. Kolpasky, Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 30 days.

(21) Appl. No.: 11/939,782

(22) Filed: Nov. 14, 2007

(65) Prior Publication Data

US 2009/0121520 A1    May 14, 2009

(51) Int. Cl.
*B60J 7/00* (2006.01)
(52) U.S. Cl. .................................. 296/190.11
(58) Field of Classification Search ............ 296/190.11, 296/146.1, 146.5, 37.16, 37.6
See application file for complete search history.

(56) References Cited

U.S. PATENT DOCUMENTS

| | | | | |
|---|---|---|---|---|
| 3,419,304 A | * | 12/1968 | Sangimino | 296/99.1 |
| 4,076,301 A | * | 2/1978 | Gergoe | 296/50 |
| 4,671,013 A | * | 6/1987 | Friese et al. | 296/146.2 |
| 4,793,099 A | * | 12/1988 | Friese et al. | 296/146.16 |
| 5,536,057 A | * | 7/1996 | Stewart | 296/37.16 |
| 6,513,863 B1 | * | 2/2003 | Renke et al. | 296/190.11 |
| 6,547,298 B2 | * | 4/2003 | Sotiroff et al. | 296/24.43 |
| 6,786,535 B1 | * | 9/2004 | Grzegorzewski et al. | 296/190.11 |
| 6,796,600 B1 | * | 9/2004 | Ferer et al. | 296/146.1 |
| 6,837,529 B2 | * | 1/2005 | Kharod et al. | 296/190.11 |
| 7,083,220 B2 | * | 8/2006 | Suzuki | 296/190.1 |
| 7,246,847 B2 | * | 7/2007 | Polewarczyk | 296/190.11 |
| 2001/0030448 A1 | * | 10/2001 | Wilson | 296/190.11 |

* cited by examiner

*Primary Examiner*—Kiran B. Patel

(57) ABSTRACT

A closure panel assembly is positioned within a through-opening of a vehicle body and provides access to a cargo area. The closure panel assembly has a hinged panel that pivots within the through-opening, a window portion that stows within the hinged panel, and an engagement device for selectively coupling the window portion with the hinged panel. The window portion connects to a surface of the vehicle body adjacent to the through-opening when the window portion is not stowed, and the hinged panel is pivotable irrespective of whether the window portion is stowed therewithin. A frame portion defines the through-opening, and the closure panel assembly is a midgate separating a passenger compartment from the cargo area. The engagement device has a ball detent assembly, and the window portion is connectable to the vehicle body using a push-push type connector. A drive motor positions the window portion and the hinged panel.

5 Claims, 3 Drawing Sheets

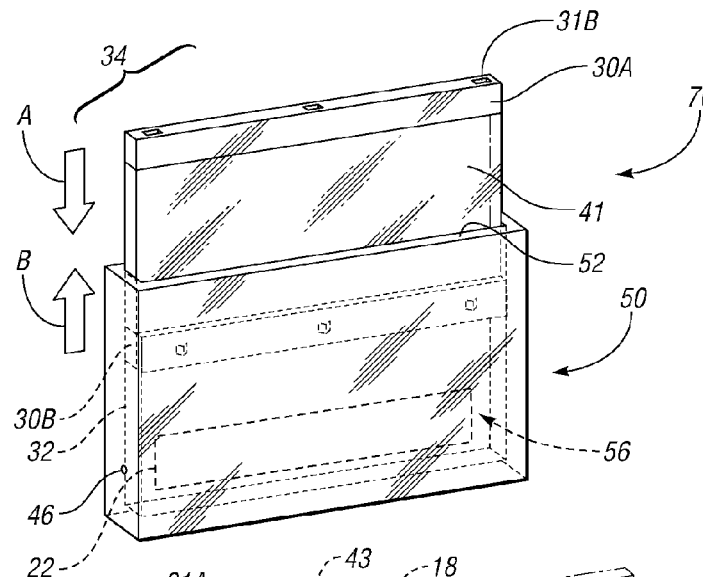
FIG. 2
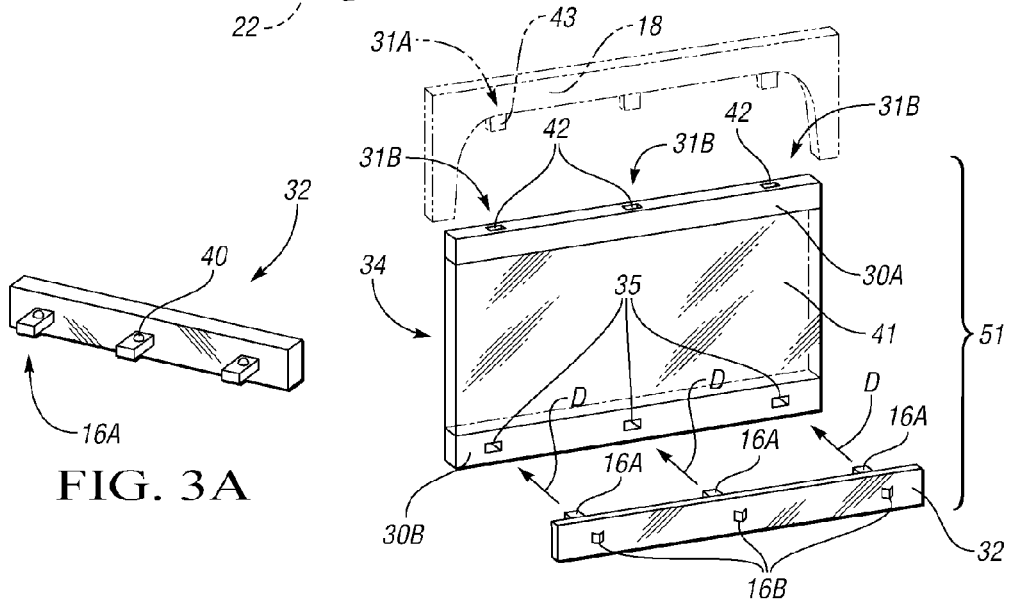
FIG. 3A
FIG. 3
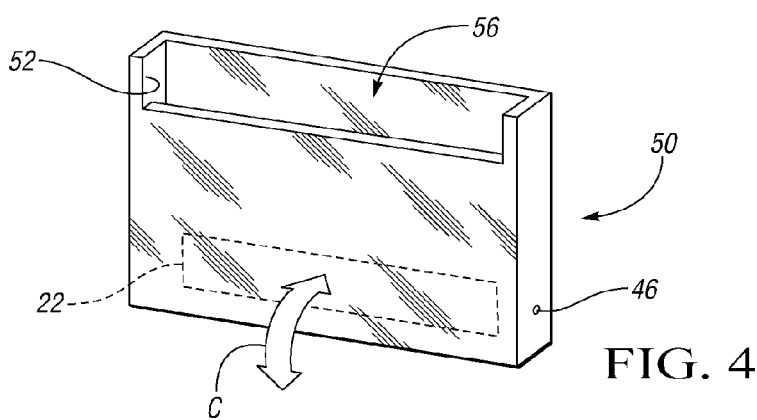
FIG. 4

ENHANCED FUNCTIONALITY VEHICLE CLOSURE PANEL ASSEMBLY

TECHNICAL FIELD

The invention relates to a vehicle closure panel assembly having a through-opening, a pivoting or hinged lower panel, and a window portion that can be selectively stowed within a cavity of the hinged lower panel, or alternately connected to the vehicle body within the through-opening when the hinged panel is separately pivoted.

BACKGROUND OF THE INVENTION

Certain vehicles include vehicle body openings or through-openings, such as between a passenger compartment and a cargo area, and/or between a passenger compartment or cargo area and the vehicle exterior. Vehicle tailgates and midgate assemblies often include a panel that is constructed of a metal or a composite material, and a transparent window portion that is connected to the panel. The panel and window cooperate to selectively obstruct the body opening. Such a panel may pivot to an open position to unblock the body opening and allow access to the cargo area. The window may be pivoted and/or removed as needed to increase the size of the through-opening, such as may be desirable when transporting relatively lengthy objects such as lumber within the rear cargo area.

SUMMARY OF THE INVENTION

Accordingly, a vehicle body is provided that defines a cargo area and a closure panel assembly. The closure panel assembly is positioned within a through-opening between the cargo area and a passenger compartment, and has a hinged panel that pivots with respect to the vehicle body, a window portion that is selectively stowable within the hinged panel, and an engagement device for selectively coupling the window portion with the hinged panel. The window portion connects to the vehicle body when the window portion is not stowed within the hinged panel, and the hinged panel is pivotable irrespective of whether the window portion is stowed therewithin.

In one aspect of the invention, a frame portion defines the through-opening and receives a periphery of the closure panel assembly.

In another aspect of the invention, the closure panel assembly is configured as a midgate suitable for separating the passenger compartment from the cargo area.

In another aspect of the invention, a retention feature is connected to the window portion using a mating retention feature that is connected to the vehicle body. One retention feature retains the other in response to a threshold force, and then releases the other in response to a subsequent threshold force.

In another aspect of the invention, the engagement device includes at least one ball detent assembly, wherein movement of a ball portion of the ball detent assembly alternately couples and decouples the hinged panel and the window portion.

In another aspect of the invention, a controller and a drive motor selectively position the window portion and the hinged panel.

In another aspect of the invention, a closure panel assembly is provided for use with a vehicle body, and includes an upper closure assembly having a window portion operatively connected to a support member, a lower closure assembly that pivots with respect to the vehicle body, the lower closure assembly defining an internal cavity, and an engagement device. The engagement device is positioned at least partially within the internal cavity, and has a coupling mechanism for selectively coupling the upper and lower closure assemblies, with the upper closure assembly being alternately stowable within the internal cavity and retainable along the upper support member with respect to the vehicle body, irrespective of whether the lower closure assembly is pivoted.

In another aspect of the invention, a closure panel assembly is provided for connecting adjacent compartments of a vehicle body, and has adjacent first and second openings together forming a through-opening between the adjacent compartments. The closure panel assembly includes a hinged panel that pivots with respect to the vehicle body to form the first opening or the through-opening, and a window assembly that may be lowered into a cavity of the hinged panel to form the second opening or the through-opening, with the through-opening being formed only when the hinged panel is pivoted with respect to the vehicle body.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic perspective view of the closure panel assembly of the invention;

FIG. 3 is a schematic perspective view of the upper closure assembly and a portion and an engagement device portion of the closure panel assembly of FIG. 2;

FIG. 3A is a schematic perspective view of the engagement device shown in FIG. 3;

FIG. 4 is a schematic perspective view of the lower closure assembly of the closure panel assembly of FIG. 2;

DESCRIPTION OF THE PREFERRED EMBODIMENTS

Figure 1:
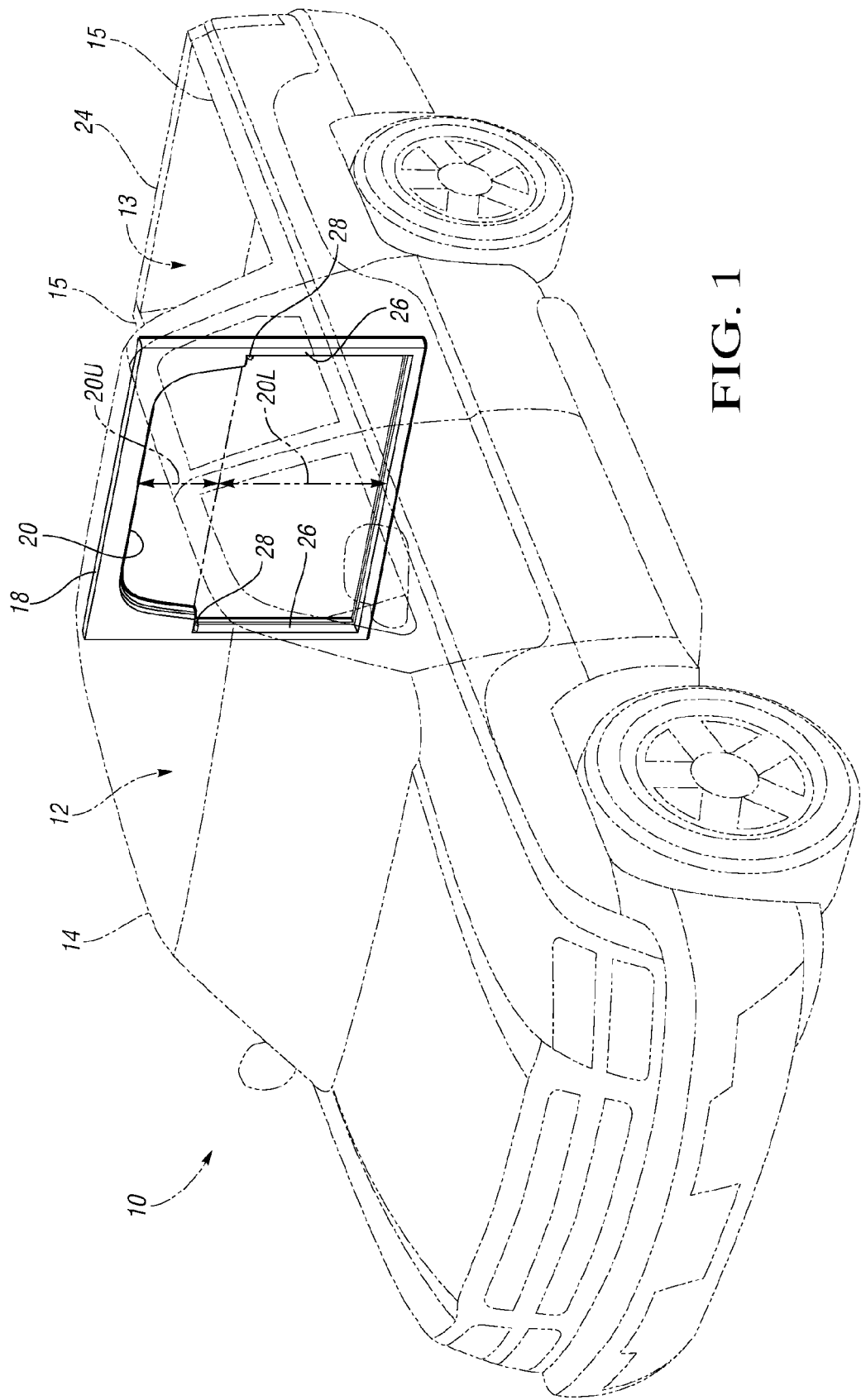
FIG. 1 is a schematic perspective view of a vehicle including a vehicle body.

Referring to the drawings wherein like reference numbers correspond to like or similar components throughout the several figures, and beginning with FIG. 1, a vehicle 10 includes a vehicle body 14. In the embodiment depicted in FIG. 1, the vehicle body 14 is configured in a style of a pickup truck, and includes two cargo box sidewalls 15 and a pivoting tailgate 24 that cooperate to at least partially define a cargo area 13. Within the scope of the invention, however, other body styles may be used, such as sport utility vehicles (SUV) or other vehicles having a similar cargo area 13, whether open or enclosed.

The vehicle body 14 also defines a vehicle interior or a passenger compartment 12 that is positioned forward of the cargo area 13. The vehicle body 14 is operatively connected to or formed integrally with a frame portion or frame 18 that defines a through-opening 20. When unobstructed, the through-opening 20 connects or otherwise provides access between the adjacent passenger compartment 12 and the cargo area 13. The through-opening 20 includes an upper opening 20U and a lower opening 20L that are selectively unobstructed or opened within the frame 18, as will be described below, to partially or fully open the through-opening 20. The frame 18 may be characterized or defined by two generally vertically oriented segments 26 that at least partially define the periphery of the through-opening 20. Each of the segments 26 may have a channel or track 28 rigidly mounted thereto or formed integrally therewith for receiving and retaining a periphery of a closure panel assembly 70 of the invention, which will now be described in detail with reference to FIG. 2.

Referring to FIG. 2, the closure panel assembly 70 includes an upper closure assembly 34 and a lower closure assembly 50, each of which are separately moveable within the through-opening 20 (see FIG. 1) to thereby open the upper opening 20U or lower opening 20L, respectively, or moveable together to fully open the through-opening 20. The lower closure assembly 50 has a plurality of side walls 52 defining an internal cavity 56, and is hinged or otherwise rotatable or pivotable with respect to the vehicle body 14 (see FIG. 1) or the frame 18 using at least one pivot mechanism 46 (see FIG. 4). The upper closure assembly 34 has a window pane or glass portion 41, referred to hereinafter for simplicity as the window 41, an upper support member 30A, and a lower support member 30B. The upper closure assembly 34 is moveable in the direction of arrow B in response to movement of a window regulator 22 of the type known in the art to disconnect the upper closure assembly 34 from the vehicle body 14 (see FIG. 1) or frame 18 (see FIG. 1), as will be described below, and in the direction of arrow A for stowing within the internal cavity 56 of the lower closure assembly 50. Likewise, the upper closure assembly 34 is moveable in the direction of arrow B using the window regulator 22 for returning the upper closure assembly 34 to a fixed position within the through-opening 20 (see FIG. 1), as will be described below with reference to FIGS. 5A and 5B.

Referring to FIG. 3, the upper closure assembly 34 connects to the engagement device 32 to form a panel assembly 51, with the upper closure assembly 34 including the respective upper and lower support members 30A, 30B referred to hereinabove. Each of the support members 30A, 30B is operatively connected to a different end of the window 41. The upper support member 30A includes a retention feature 31B, and the vehicle body 14 and/or the frame 18 shown in fragmentary view in phantom, and includes a mating retention feature 31A.

In the embodiment shown in FIG. 3, the retention feature 31B is a set of channels or receptacles 42 formed in the upper support member 30A, and the retention feature 31A is a mating set of levers or pawls 43 that are insertable into the receptacles 42 and receivable/retainable thereby. For clarity, the pawls 43 shown in FIG. 3 are connected to the frame 18 and extend therefrom in a visible manner. However, the pawls 43 could also be obscured or hidden within the frame 18 to present the appearance of FIG. 1, such that the pawls 43 are not easily visible when the upper closure assembly 34 is moved in the direction of arrow A (see FIG. 2). The retention features 31A, 31B as shown configured as a set of push-push type fittings or connectors of the type known in the art, such as that used to selectively open/close a door of a CD or DVD player, i.e. any set of connectors operable for coupling in response to a force applied in the direction of arrow B, and for decoupling in response to an immediately subsequent force applied in the direction of arrow B, with coupling/decoupling occurring upon alternate applications of the same force (arrow B).

Referring to FIGS. 3 and 3A, the lower support member 30B includes a plurality of channels 35 configured for receiving an equal number of coupling mechanisms 16A therein. In the embodiment of FIG. 3, the coupling mechanisms 16A are configured as ratchets or ball detent mechanisms of the type known in the art, which are operatively connected to an engagement device 32, such as a portion of a window regulator mechanism 22 (see FIG. 4) that is positioned at least partially within the internal cavity 56 of the lower closure assembly 50 (see FIG. 2). The channels 35 are configured for receiving a ball portion 40 (see FIG. 3A) of the ball detent mechanism when inserted into the channels 35 in the direction of arrows D, which locks or couples the engagement device 32 with the upper panel assembly 34 so that they are able to move in unison.

When an actuation end 16B of each of the coupling mechanisms 16A is depressed, for example using a moveable interlock bar portion (not shown) or other suitable actuator, the ball portion 40 is released, thus allowing the upper panel assembly 34 to move within an allowable range of motion within the internal cavity 56 (see FIG. 2). Those skilled in the art will recognize that additional embodiments of the coupling mechanism 16A may be envisioned within the scope of the invention, which may extend to any coupling or couplings operable for selectively coupling the engagement device 32 and the upper closure assembly 34 as required.

Referring to FIG. 4, the engagement device 32 connects to the lower closure assembly 50 to the engagement device 32 form a lower assembly 51. The lower closure assembly 50 has a plurality of side walls 52 defining the internal cavity 56 as discussed above, as well as one or more pivot mechanisms 46. The engagement device 32 is operatively connected the window regulator 22, which is disposed at least partially within the internal cavity 56. The lower closure assembly 50 is alternately pivotable or otherwise moveable in the direction of arrow C about the pivot mechanisms 46 with respect to a surface of the vehicle 10 (see FIG. 1), such as the track 28 or an equivalent portion of the vehicle body 14 (see FIG. 1) in order to present, expose, or open the lower opening 20L (see FIGS. 1 and 5B).

Figures 5A, 5B, 5C, 5D:
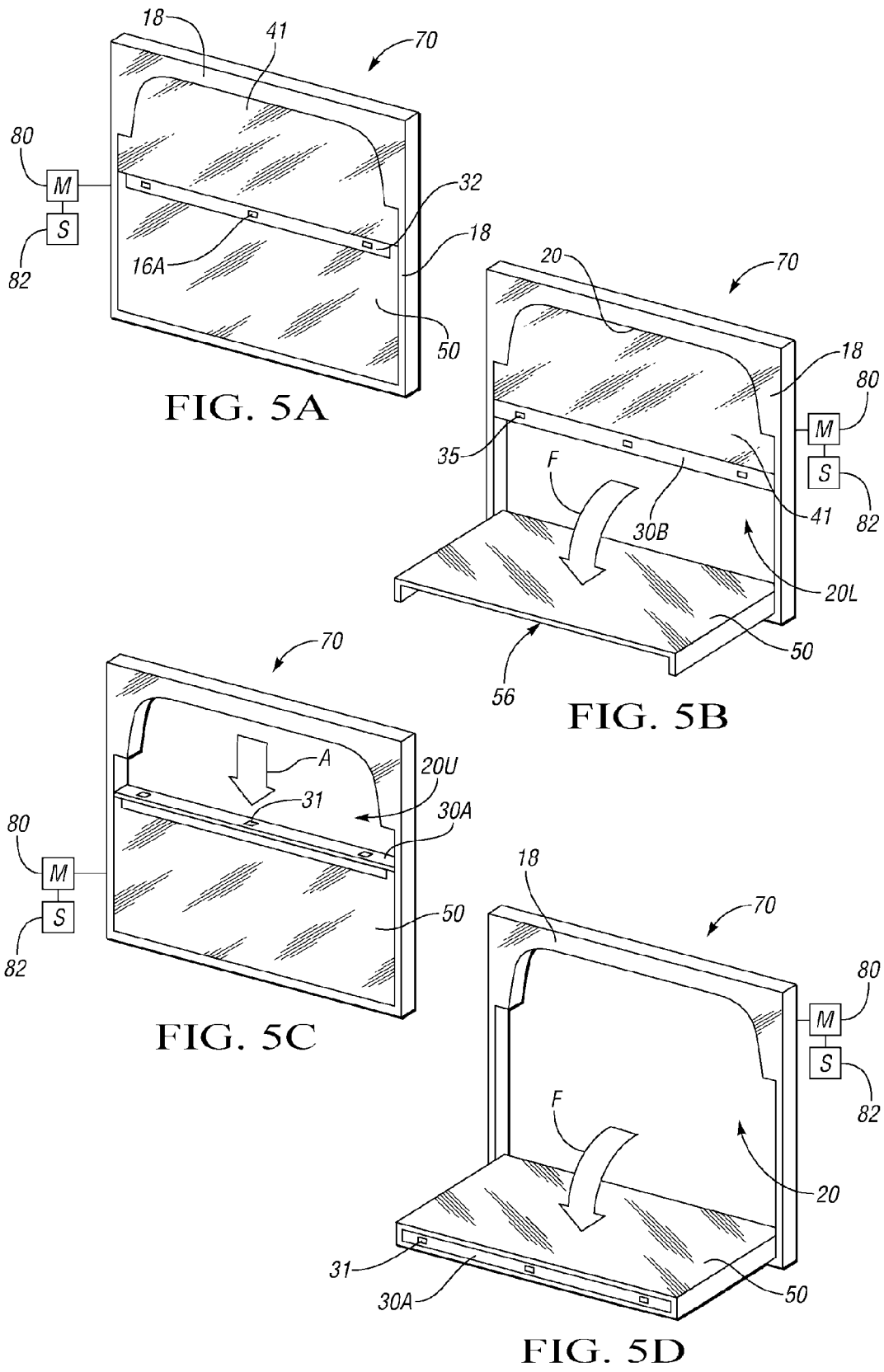
FIG. 5A is a schematic perspective view of the closure panel assembly in a first configuration.
FIG. 5B is a schematic perspective view of the closure panel assembly in a second configuration.
FIG. 5C is a schematic perspective view of the closure panel assembly in a third configuration.
FIG. 5D is a schematic perspective view of the closure panel assembly in a fourth configuration.

Referring to FIG. 5A, the closure panel assembly 70 is configured with the window 41 of the upper closure assembly 34 (see FIG. 3) at a fixed position within the through-opening 20, i.e. at a position sufficiently blocking the upper opening 20U (see FIG. 1). The lower closure assembly 50 is likewise positioned within the through-opening 20 and sufficiently blocking or obstructing the lower opening 20L (see FIG. 1). A motor 80 and switch 82 may be operatively connected to a suitable portion of the closure panel assembly 70, such as to the window regulator 22 (see FIGS. 2 and 4), for automatically moving and/or selectively positioning one or both of the upper and lower closure assemblies 34 and 50, respectively. In the configuration of FIG. 5A, the through-opening 20 (see FIG. 1) is completely blocked or otherwise obstructed by the closure panel assembly 70 to thereby fully separate the cargo area 13 from the vehicle interior 12 (see FIG. 1).

Referring to FIG. 5B, the closure panel assembly 70 is configured with the lower closure assembly 50 fully rotated or pivoted in the direction of arrow F to thereby present or open only the lower opening 20L, while the window 41 remains in the fixed position of FIG. 5A to block or obstruct the upper opening 20U. In the configuration of FIG. 5B, partial access to the cargo area 13 (see FIG. 1) is provided through the lower opening 20L, while the window 41 of the upper panel assembly 34 (see FIG. 3) remains connected to the vehicle body 14 (see FIG. 1) via the frame 18 or its equivalent.

Referring to FIG. 5C, another configuration of the closure panel assembly 70 is shown in which the window 41 (see FIGS. 5A and 5B) is moved in the direction of arrow A into the internal cavity 56 (see FIG. 5B) of the lower closure assembly 50. In this configuration, the upper opening 20U is now fully unobstructed or opened, allowing partial access to the cargo area 13 (see FIG. 1) while the lower closure assembly 50 continues to block or obstruct the lower opening 20L.

Referring to FIG. 5D, the upper panel assembly 34, which is now contained within the internal cavity 56 of the lower panel assembly 50, and the lower closure assembly 50 itself are rotated or pivoted in unison in the direction of arrow F to fully unblock or open the through-opening 20, i.e. to simultaneously present or open both of the lower opening 20L and the upper opening 20U, which together form the through-opening 20. In this configuration, the fullest available level of access to the cargo area 13 (see FIG. 1) is provided, while the window 41 and the rest of the upper closure assembly 34 remain well protected within the cavity 56 (see FIG. 5B) of the lower closure assembly 50 without requiring separate removal and/or storage of the window 41.

Within the scope of the invention, the lower closure assembly 50 may rotate or pivot with respect to the pivot mechanisms 46 (see FIG. 4), and thus with respect to the vehicle body 14 (see FIG. 1) or frame 18 (see FIG. 1), when the upper closure assembly 34 (see FIG. 3) and the window 41 are positioned either fully externally to or fully within the internal cavity 56. The closure panel assembly 70 may be configured with various limits switches, sensors, and/or other such means (not shown) to ensure that manual or automatic actuation of the closure panel assembly 70 is prevented or disabled whenever the upper closure assembly 34 is not at a predetermined position, such as fully retracted into the internal cavity 56 or fully deployed within the upper opening 20U and secured within the frame 18 as explained above.

While the best modes for carrying out the invention have been described in detail, those familiar with the art to which this invention relates will recognize various alternative designs and embodiments for practicing the invention within the scope of the appended claims.

The invention claimed is:

1. A closure panel assembly for use with a vehicle body, comprising:
    an upper closure assembly having a window portion operatively connected to an upper support member;
    a lower closure assembly configured for pivoting with respect to the vehicle body, said lower panel assembly defining an internal cavity; and
    an engagement device positioned at least partially within said internal cavity and having a coupling mechanism for selectively coupling said upper closure assembly and said lower closure assembly;
    wherein said upper closure assembly is alternately stowable within said internal cavity and retainable at said upper support member with respect to the vehicle body, irrespective of whether said lower closure assembly is pivoted.

2. The closure panel assembly of claim 1, further comprising a frame having a track configured for receiving a periphery of said lower panel assembly, said frame defining a through-opening for connecting a cargo area and a passenger compartment of the vehicle.

3. The closure panel assembly of claim 2, wherein the closure panel assembly is configured as a midgate for separating a passenger compartment of the vehicle body from said cargo area.

4. The closure panel assembly of claim 2, said upper support member including a first fitting and said second surface including a second fitting that is mateable with said first fitting, wherein said first and said second fittings are configured as a set of push-push type connectors.

5. The closure panel assembly of claim 2, wherein said coupling mechanism includes at least one ball detent mechanism, wherein movement in one direction of a portion of said at least one ball detent mechanism couples said upper panel assembly with said lower panel assembly, and movement in another direction of said portion of said at least one ball detent mechanism decouples said upper panel assembly from said lower panel assembly.

* * * * *